United States Patent [19]

Wieting et al.

[11] Patent Number: 4,996,788

[45] Date of Patent: Mar. 5, 1991

[54] ICE FISHING ALARM

[76] Inventors: Brian G. Wieting, Rte. 2, Box 200G, Wausaukee, Wis. 54177; Alvin P. Wiedemeier, 278A, Box 4, Crivitz, Wis. 54114

[21] Appl. No.: 406,034

[22] Filed: Sep. 11, 1989

[51] Int. Cl.$^5$ .............................................. A01K 97/12
[52] U.S. Cl. ................................................................ 43/17
[58] Field of Search ............................................. 43/17

[56] References Cited

U.S. PATENT DOCUMENTS

| | | | |
|---|---|---|---|
| 2,170,000 | 8/1939 | Eggleston | 43/17 |
| 2,654,176 | 10/1953 | Kachelski | 43/17 |
| 2,741,054 | 4/1956 | Brundage | 43/17 |
| 2,785,493 | 3/1957 | Thiel | 43/17 |
| 2,786,294 | 3/1957 | Whitacre | 43/17 |
| 3,359,673 | 12/1967 | Roemer | 43/17 |
| 3,378,945 | 4/1968 | Johnson | 43/17 |
| 4,285,154 | 8/1981 | Grahl | 43/17 |
| 4,516,348 | 5/1985 | Hirose | 43/17 |
| 4,566,216 | 1/1986 | Randall | 43/17 |
| 4,823,494 | 4/1989 | Waterman | 43/17 |

Primary Examiner—Kurt Rowan
Attorney, Agent, or Firm—Leon Gilden

[57] ABSTRACT

An ice fishing alarm is set forth wherein a platform is provided to accommodate a spool rotatably mounted onto a downwardly depending shaft rotatably mounted to the platform wherein the shaft is provided with an "L" shaped bracket whereupon a fish strike will rotate the bracket and shaft disengaging the shaft from an overlying downwardly oriented flag. Release of said flag vertically orients the flag and effects contact with an electrical circuit to illuminate a luminescent bulb positioned axially of a transparent hollow cylinder supporting the flag. The hollow cylinder is formed to communicate with an electrical transmitter and transmit a signal to a remote receiver while simultaneously completing a circuit to eliminate the aforenoted luminescent device.

1 Claim, 1 Drawing Sheet

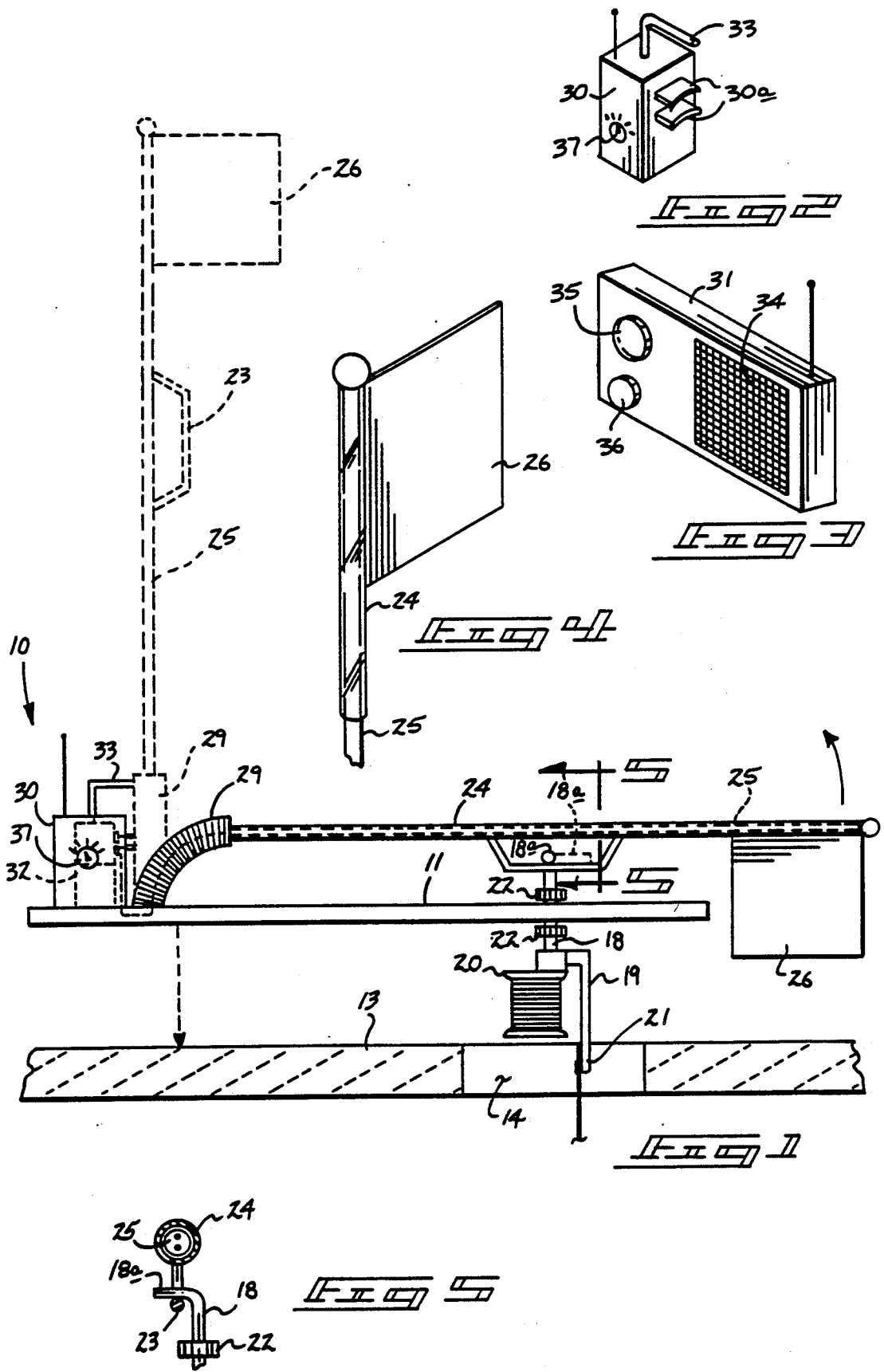

ICE FISHING ALARM

BACKGROUND OF THE INVENTION

1. Field of the Invention

The field of invention relates to ice fishing apparatus, and more particularly relates to ice fishing apparatus that includes a signalling means including a plurality of signals to indicate a fish strike.

2. Description of the Prior Art

Ice fishing signalling devices are known in the prior art and have been utilized, but the very nature of the sport dictates use of the apparatus in cold and inclement weather wherein it is desirable at times to utilize a plurality of signalling means to alert a user of the apparatus of a fish strike. Furthermore, a user may at times desire to seek shelter and the use of various signals to indicate a fish strike are helpful when a user is remotely positioned relative to ice fishing apparatus.

Prior art apparatus has includes various device for ice fishing indication such as set forth in U.S. Pat. No. 4,021,958 to Snodie which sets forth the combination of a rotatable shaft mounted relative to a platform releasing a spring biased flag to signal a fish strike. The Snodie patent, however, does not provide the refinements of the instant invention utilizing an underlying truss relative to the flag pole, as does the instant invention, nor does the Snodie patent provide the illumination and signal transmission means of the instant invention.

U.S. Pat. No. 4,437,255 to Reed sets forth a fish detection system utilizing a radio transmitter wherein a switch actuator is magnetically held in an open position and moved by fish activity to move the switch to a closed position to energize a transmitter and send a signal. The transmission means of the Reed patent does not set forth the combination of transmission and illumination means as well as the use of a biased fish signaling flag as does the instant invention.

U.S. Pat. No. 4,520,586 to Moisan sets forth a signal indicator indicating a fish strike wherein a lamp and signal secured to a flag indicate a fish strike by biasing a plurality of batteries into electrical communication with a forwardly oriented light bulb. The orientation of the light bulb, as opposed to the instant invention, does not provide the visibility of the instant invention nor does the patent provide for the indication by illumination and audible signal to a remote receiver, as does the instant invention.

U.S. Pat. No. 3,997,744 to Higo sets forth a level detector utilizing a float and a magnet to bring a reed switch into operation to actuate level to provide visual indication of the liquid level by illumination purposes.

As such, it may be appreciated that the instant invention addresses the problems of providing a fish indicating means utilizing refinements effecting a plurality of signal generating means to provide a user various means to indicate fish strike during ice fishing.

SUMMARY OF THE INVENTION

In view of the foregoing disadvantages inherent in the known types of ice fishing apparatus now present in the prior art, the present invention provides an ice fishing alarm wherein the same provides a platform which can be compactly stored during periods of non-use and may be extended during periods of use for rotatably mounting a shaft to release a spring biased signal pole formed with transparent material to house an illumination means therein and simultaneously relay an audible and visual signal to a remote receiver. As such, the general purpose of the present invention, which will be described subsequently in greater detail, is to provide a new and improved ice fishing alarm which has all the advantages of the prior art ice fishing apparatus and none of the disadvantages.

To attain this, the present invention comprises an ice fishing apparatus which includes a platform compactly storable during periods of non-use wherein the platform rotatably mounts an ice fishing shaft rotatably mounting a spool whereupon the shaft is rotatable upon a fish strike to release a biased transparent illuminated pole which is energized upon vertical orientation of the pole due to a fish strike and simultaneously emits a signal to a remote receiver. The pole support secures a signal flag at an upper terminal end.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to scope of the invention in any way.

It is therefore an object of the present invention to provide a new and improved ice fishing alarm apparatus which has all the advantages of the prior art ice fishing alarm apparatus and none of the disadvantages.

It is another object of the present invention to provide a new and improved ice fishing alarm apparatus which may be easily and efficiently manufactured and marketed.

It is a further object of the present invention to provide a new and improved ice fishing alarm apparatus which is of a durable and reliable construction.

An even further object of the present invention is to provide a new and improved ice fishing alarm apparatus which is susceptible of a low cost of manufacture with regard to both materials and labor, and which accordingly is then susceptible of low prices of sale to the consuming public, thereby making such ice fishing alarm apparatus economically available to the buying public.

Still yet another object of the present invention is to provide a new and improved ice fishing alarm apparatus which provides in the apparatuses and methods of the prior art some of the advantages thereof, while simultaneously overcoming some of the disadvantages normally associated therewith.

Still another object of the present invention is to provide a new and improved ice fishing alarm apparatus wherein an apparatus is provided to set forth a plurality of sealing devices medially and remotely relative to the fishing point of origin to alert a user thereof of a fish strike.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic view of the instant invention taken in elevation.

FIG. 2 is an isometric illustration of the transmitter assembly of the instant invention.

FIG. 3 is an isometric illustration of the receiver assembly of the instant invention.

FIG. 4 is an isometric illustration of an uppermost portion of the flag of the instant invention illustrating the detail thereof.

FIG. 5 is an orthographic view taken along the lines 5—5 of FIG. 1 in the direction indicated by the arrows.

DESCRIPTION OF THE PREFERRED EMBODIMENT

With reference now to the drawings, and in particular to FIGS. 1 to 5 thereof, a new and improved ice fishing alarm embodying the principles and concepts of the present invention and generally designated by the reference numeral 10 will be described.

More specifically, it will be noted that the ice fishing alarm apparatus 10 essentially comprises an non-metallic platform 11 wherein the platform may be formed of synthetic polymer type materials or the like. The table 11 is typically arrayed to overlie an ice layer 13 and to align an ice opening 14 with a fishing shaft 18 orthogonally and rotatably mounted through platform 11.

The shaft 18 is rotatably mounted through the platform 11 to include an integrally formed "L" bracket 19 extending over and beyond a rotatably mounted spool 20 positioned about a lower terminal end of shaft 18. The spool 20 includes a fishing line threaded through an opening 21 formed adjacent a lowermost end of the bracket 19 for securement of fishing hooks and the like to the fishing line for catching a fish.

The rotatably mounted shaft 18 is formed with a plurality of integrally secured abutments 22 sandwiching the platform 11 therebetween wherein the abutments 22 maintain the positioning of the shaft 18 at a predetermined level, as illustrated in FIG. 1 for example. The shaft 18 is formed with an upper orthogonal leg 18a cooperating with an underlying truss 23 formed with a lowermost link parallel to a transparent hollow pole 24. The leg 18 is positionable to secure the pole 24 in a lowermost position and upon rotation of the bracket 19 to a fish strike, the leg 18a will rotate and disengage from the truss 23 for purposes to be described more fully below.

The transparent hollow pole 24 mounts a signal flag 26 at a forwardmost portion of the pole and houses an elongate coextensive florescent bulb 25 therethrough. The florescent bulb 25 may be of various colorations, as may be the transparent pole 24, for providing indication under varying light conditions.

The lowermost end of the pole 24 has fastened thereto a metallic coil-spring base 29 to normally bias the signal flag 26 and associated pole 24 in a vertical orientation, as illustrated in phantom in FIG. 1. The coil-spring 29 is of metallic construction to effect conduction of electricity.

a multi-band FM transmitter 30 is fixedly mounted to an upper surface of platform 11 cooperating with an FM receiver 31. It is desirable to provide a frequency dial 37 to enable changing of frequency transmission signals of the transmitter 30 to avoid interference and duplication of surrounding signal generating transmitters. Accordingly, six to eight frequency variations are utilized by the transmitter 30. Each of the transmitter and receiver apparatus include a self-contained battery supply and wherein furthermore the transmitter 30 includes an "L" shaped electrical contact 33 extending upwardly and forwardly of the transmitter 30 in a direction parallel to a pair of forwardly projecting stabilizing bars 30a with arcuate forwardmost ends of complementary configuration to the exterior surface of the spring 29. Upon release of the pole 24 by the leg 18a, the pole 24 pivots to a vertical position wherein the stabilizing bars "W" capture and medially position the spring 29 in a desired orientation relative to the transmitter 30 wherein as noted in FIG. 1, the contact 33 and the stabilizing bars "W" extend forwardly of the transmitter an equal distance and thereby the stabilizing bars "W" prevent damage to the contact 33 during use.

Upon contact of the coil-spring 29 and the contact 33, electrical communication is effected to the included bulb 25. Typically, the bulb 25 is electrically communicating with the battery 32 positioned within the transmitter 30 through a first battery pole and upon communication with the contact 33, electrical circuit is completed to illuminate the bulb 25 utilizing electrical direct current circuitry in a conventional and well known manner.

Simultaneously an FM signal is directed from the transmitter 30 to the receiver 31 and enunciated through the associated speaker 34. A light 35 on the receiver 31 further provides indication to a user of a fish strike and wherein a volume control 36 of conventional construction enables modulation of the receiving signal enunciated through the speaker 34.

U.S. Pat. No. 4,437,255 incorporated herein by reference is illustrative of a typical transmitter receiver circuitry compatible for use with the instant invention.

In this manner therefore, a plurality of signals including a mechanical and electrically communicated signal are directed to enable a user of the apparatus to be remotely positioned in a shelter of comparative comfort until a fish strike.

The manner of usage and operation of the instant invention therefore should be apparent from the above description and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An ice fishing alarm apparatus comprising,
   a horizontal platform means vertically positionable above a support surface, and
   a shaft rotatably mounted through said platform means including a spool rotatably mounted at a lower terminal end of said shaft and a leg member extending outwardly and parallel to said shaft accepting a fishing line from said spool therethrough to impart rotation of said shaft upon a fish strike, and
   an upper terminal end of shaft including an "L" shaped leg cooperatively positionable over a truss member, said truss member is arranged parallel to and underlying a signal shaft wherein said truss member is integrally secured to said signal shaft and wherein said shaft is securable in a first horizontal position upon engagement of said "L" shaped leg over said truss, and
   a flag secured to a forwardmost end of said signal shaft, and
   a coil-spring secured to said signal shaft at a lowermost end to bias said signal shaft in a second vertical position when said "L" shaped leg is disengaged from said truss, and
   a transmitter means for directing electrical signal upon said signal shaft pivoting from said from horizontal position to said second vertical position, and
   wherein a receiver means is remotely positionable relative to said transmitter means for receiving said signal from said transmitter means, and
   wherein said receive means includes a light indicator and a speaker for effecting a visual and audible signal respectively upon said shaft pivotal to said second position and effecting transmission from said transmitter means, and
   wherein said transmitter means includes a self-contained battery supply and electrical contact member for electrical contact with said coil spring to effect transmission of a signal from said transmitter means and to simultaneously effect an electrical circuit to illuminate a luminescent means within said signal shaft, and
   wherein said signal shaft comprises a transparent cylindrical member housing said luminescent means therein, and
   wherein said transmitter means includes a plurality of vertically spaced forwardly projecting stabilizing bars formed with arcuate end of complementary configuration to said spring and wherein said stabilizing bars project forwardly a distance equal to the forward projection of the contact member.

* * * * *